United States Patent

Schuplin

[11] 3,887,965
[45] June 10, 1975

[54] BUNDLING TIE

[76] Inventor: Jerome T. Schuplin, Parma Heights, Ohio

[73] Assignee: Fastway Fasteners, Inc., Lorain, Ohio

[22] Filed: Sept. 4, 1973

[21] Appl. No.: 394,291

[52] U.S. Cl. .......................... 24/16 PB; 248/74 PB
[51] Int. Cl. ...................... B65d 63/100; F16l 3/22
[58] Field of Search ............. 248/70, 71, 68, 74 PB, 24/17 AP, 73 P, 73 PB, 73 PF, 73 AP, 206 A, 208 A, 16 PB, 85/5 R

[56] References Cited
UNITED STATES PATENTS

| | | | |
|---|---|---|---|
| 2,969,216 | 1/1961 | Hallsey | 248/71 |
| 3,022,557 | 2/1962 | Logan | 24/17 AP |
| 3,144,695 | 8/1964 | Budwig | 24/73 PB UX |
| 3,214,808 | 11/1965 | Litwin | 24/16 PB |
| 3,302,913 | 2/1967 | Collyer et al. | 248/73 |
| 3,463,427 | 8/1969 | Fisher | 248/68 |
| 3,542,321 | 11/1970 | Kahabka | 248/74 PB X |
| 3,568,262 | 3/1971 | Woldman | 248/74 PB X |
| 3,590,442 | 7/1971 | Geisinger | 24/16 PB |
| 3,605,199 | 9/1971 | Eberhardt | 24/16 PB |
| 3,735,449 | 5/1973 | Rosales | 24/16 PB |

OTHER PUBLICATIONS

Panduit Pan-ty Cable Tie Bulletin PT-2 1971 248-74 PB.

Primary Examiner—Donald A. Griffin
Attorney, Agent, or Firm—Baldwin, Egan, Walling & Fetzer

[57] ABSTRACT

A bundling tie for use in looping about a plurality of elements such as wires, tubes, cables, etc. and to be drawn taunt, for mounting of the elements on a support such as for instance a circuit board or in a harness board assembly, and comprising a pawl in the head of the bundling strap with a plurality of locking teeth thereon, and wherein the pawl teeth are staggered transversely of the pawl.

17 Claims, 16 Drawing Figures

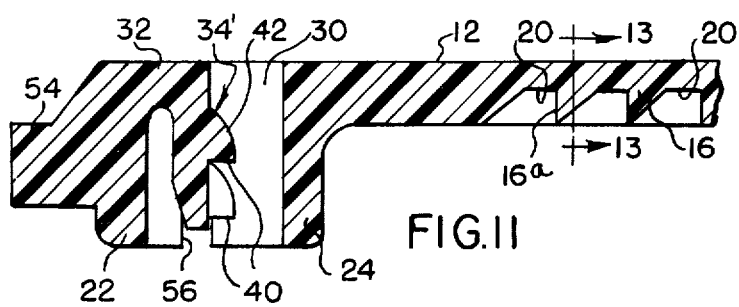
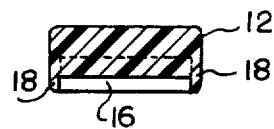
FIG.11
FIG.13
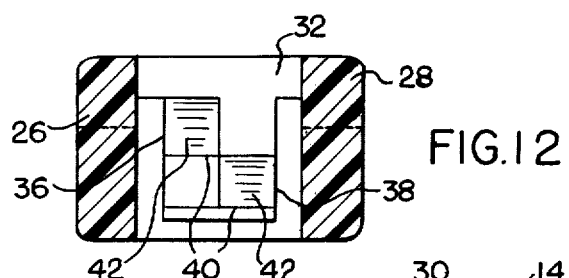
FIG.12
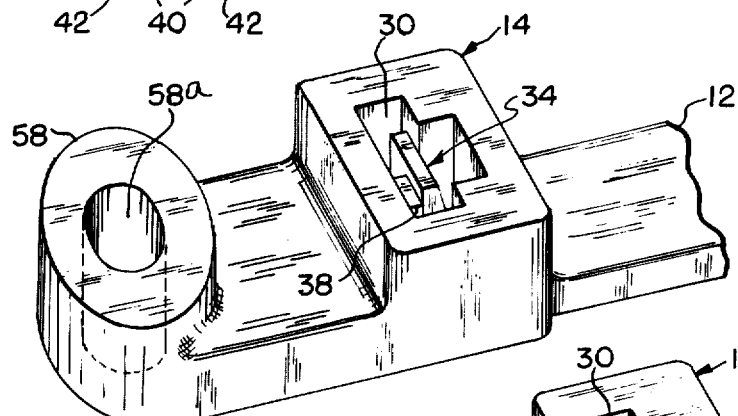
FIG.14
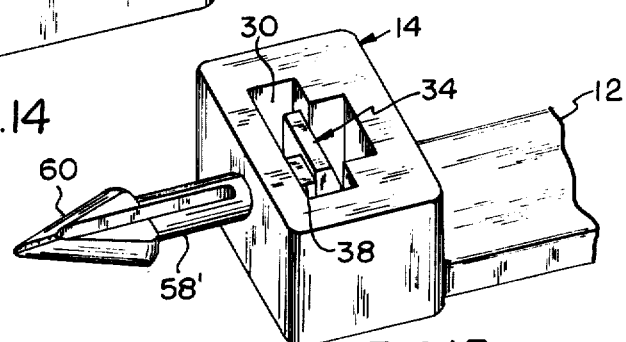
FIG.15
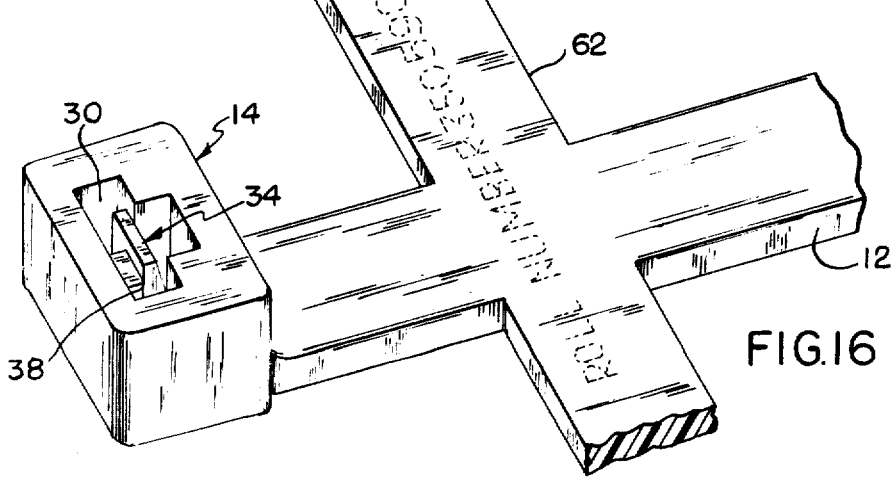
FIG.16

3,887,965

BUNDLING TIE

This invention relates in general to bundling ties for bundling together a plurality of elements, such as for instance cables or wires or the like, and more particularly relates to an improved bundling tie which has good locking action and resistance to unintentional unlocking of the tie, and a tie which can be expeditiously manufactured.

BACKGROUND OF THE INVENTION

Bundling ties for tying together a plurality of elements such as for instance wires, cables or tubes in circuit board and harness board assemblies, for use in many different environments, such as for instance, in the automotive, aircraft and railroad fields, are well known in the prior art. It is known in the art to have a plurality of locking teeth on a flexible pawl of a molded bundling tie and such as shown for instance in U.S. Pat. No. 3,214,808 issued Nov. 2, 1965 to Walter J. Litwin and U.S. Pat. No. 3,605,199 dated Sept. 20, 1971 to R. Eberhardt. Since such bundling ties are many times of very small dimensions, the manufacture of such ties, present many difficulties and especially as concerns the molding or forming of the teeth on the pawl disposed interiorly of the head of the tie.

SUMMARY OF THE INVENTION

The present invention provides a bundling tie comprising a multi-toothed pawl for bundling together a plurality of elements, such as for instance cables, wires or the like, which can be easily placed in locked condition and which effectively resists pull out of the strap from the head thereof, and a bundling tie which can be expeditiously manufactured utilizing mass production techniques.

Accordingly, the object of the invention is to provide a flexible bundling tie.

Another object of the invention is to provide an integral, one piece, molded bundling tie wherein the head portion thereof embodies a flexible pawl having a plurality of transversely staggered locking teeth thereon, and which possesses good resistance to unlocking or pull out of the strap portion from the head portion thereof, and which can be more expeditiously manufactured, using mass production molding techniques.

Another object of the invention is to provide a bundling tie of the latter described type wherein the strap portion can be easily inserted into the head portion and into locking condition, and which includes means for facilitating insertion of the strap portion through the head portion.

Another object of the invention is to provide a novel bundling tie that is easy to pick up and handle.

A still further object of the invention is to provide a novel bundling tie that has means for aiding in unlocking the tie in the event that deactuation and reuse thereof is necessary or desirable.

A still further object of the invention is to provide a bundling tie that embodies means for readily mounting the tie on a support such as for instance a harness board or a circuit board.

Other objects and advantages of the invention will be apparent from the following description taken in conjunction with the accompanying drawings wherein:

BRIEF DESCRIPTION OF THE DRAWINGS

FIG. 11 is an enlarged sectional view taken generally along the plane of line 11—11 of FIG. 9 looking in the direction of the arrows;

FIG. 12 is an enlarged sectional view taken generally along the plane of line 12—12 of FIG. 10, looking in the direction of the arrows;

FIG. 13 is a sectional view taken along the plane of line 13—13 of FIG. 10, looking in the direction of the arrows;

FIG. 14 is a fragmentary bottom perspective view of another embodiment of bundling tie of the general type of FIGS. 1 and 2;

FIG. 15 is a generally perspective view of a further embodiment of tie, and;

FIG. 16 is a fragmentary, perspective view of another embodiment of tie.

DESCRIPTION OF THE PREFERRED EMBODIMENTS

Figure 1:
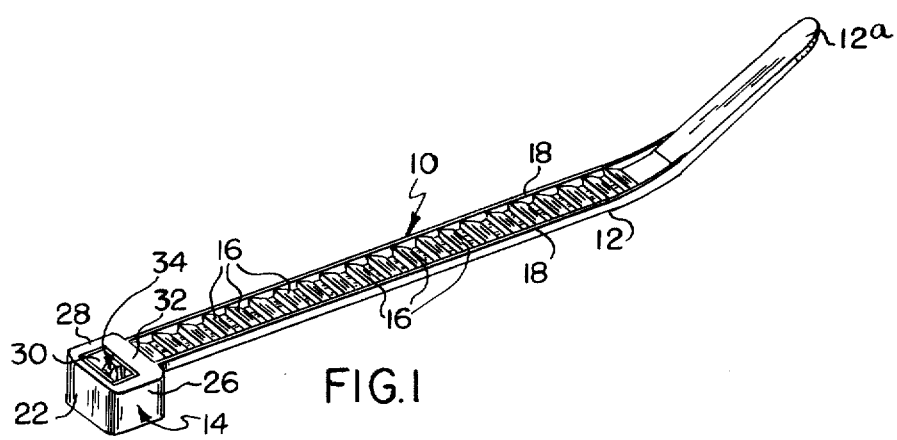
FIG. 1 is a perspective view of a bundling tie embodying the invention.

Referring now again to the drawings, there is illustrated a bundling tie 10 of elongated structure comprising a strap portion 12 and a head portion 14. The tie may be molded of a plastic type material, such as for instance nylon, polypropylene, polyethylene or like flexible type materials. As can be best seen in FIG. 1, the free end portion $12_a$ of the strap is bent or extends out of the plane of the remainder of the strap, in a direction away from the head portion 14. This facilitates picking up of the strap by a workman, and also aids in insertion of the free end of the strap into locking coaction with the head portion 14 as will be hereinafter described.

Locking teeth 16 (FIGS. 2 and 3) of generally buttress type, are provided on one side of the strap 12 and extend betweeen the side walls 18 of the strap. Each of the teeth 16 has a working locking face $16_a$ which extends generally perpendicular to the plane of the strap, and a diagonal generally planar surface 16$_b$ sloping downwardly from the apex of the respective tooth. A generally horizontal surface or flat 20 is provided between each of the teeth for a purpose to be hereinafter set forth, thus spacing the working faces 16$_a$ of the teeth a predetermined distance apart.

The head portion 14 of the tie in the embodiment illustrated is a generally hollow rectangular shaped frame having end walls 22,24 and side walls 26,28. The walls of the head form an aperture or passageway 30 through the head and into which the strap portion 12 is adapted to be passed when the tie is looped about a bundle of elements for retaining the latter. The entrance end of the passageway 30 is beveled or sloped as at 30$_a$ to facilitate movement of the distal end of the strap portion into the passageway. Passageway 30 from the exit end thereof (FIG. 6) is, in the embodiment illustrated, of generally T-shaped configuration comprising base section 31 and cross arm section 31$_a$.

Figure 2:
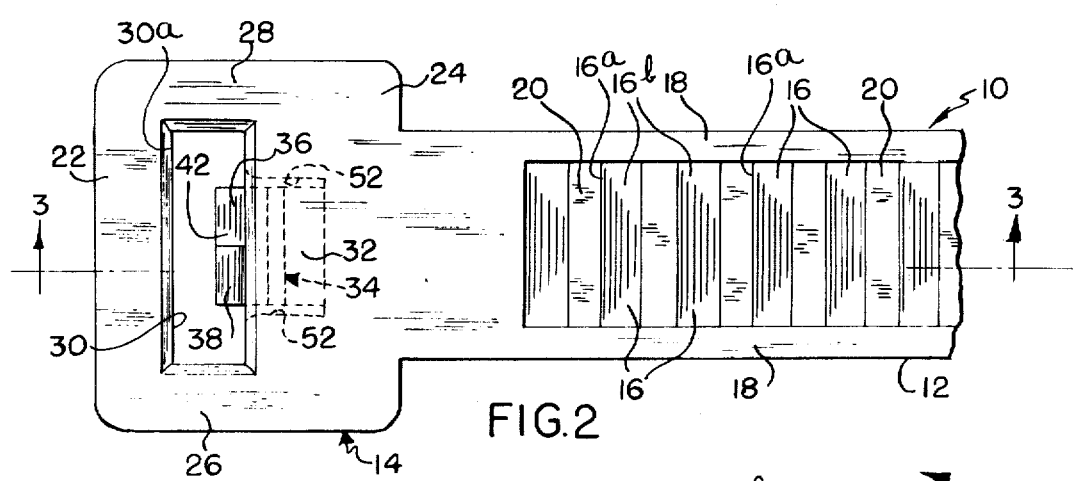
FIG. 2 is an enlarged, fragmentary plan view of the tie illustrated in FIG. 1, taken from the top thereof.
Figure 3:
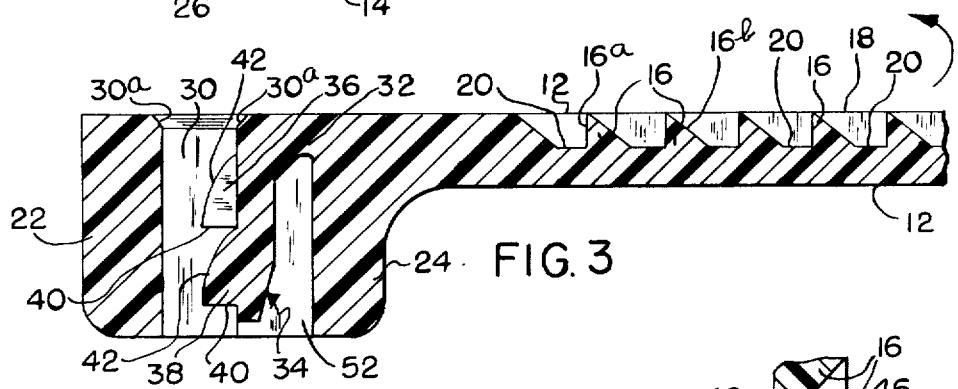
FIG. 3 is a sectional view taken generally along the plane of line 3—3 of FIG. 2 looking in the direction of the arrows, and illustrating the pawl thereof in the as molded condition.

Bridging portion 32 adjacent the entry end of passageway 30 connects side walls 26,28 with end wall 24 (FIG. 2) and provides a support for flexible pawl 34 which in the embodiment illustrated is formed integrally with bridging portion 32, and which extends downwardly therefrom into the passageway 30 in spaced relation to end wall 24, as can be best seen in FIG. 3.

The generally flexible nature of the elongated pawl 34 and its connection to bridging portion 32 in spaced relation to rear wall 24, provides for movement of the strap portion 12 through the aperture or passageway 30 past the teeth 36,38 on the pawl, until the teeth on the pawl are disposed in locking coaction with selected of the teeth on the strap portion, to maintain the tie in looped, tightly encompassing condition about a bundle of elements.

Figure 6:
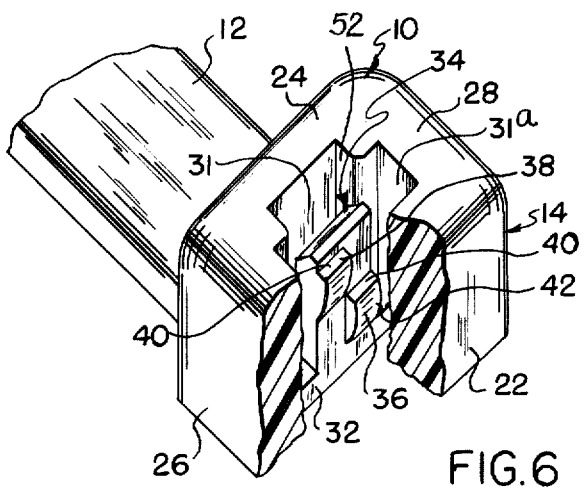
FIG. 6 is a fragmentary, broken, bottom perspective view of the head portion of the tie of FIGS. 1 and 2.
Figure 9:
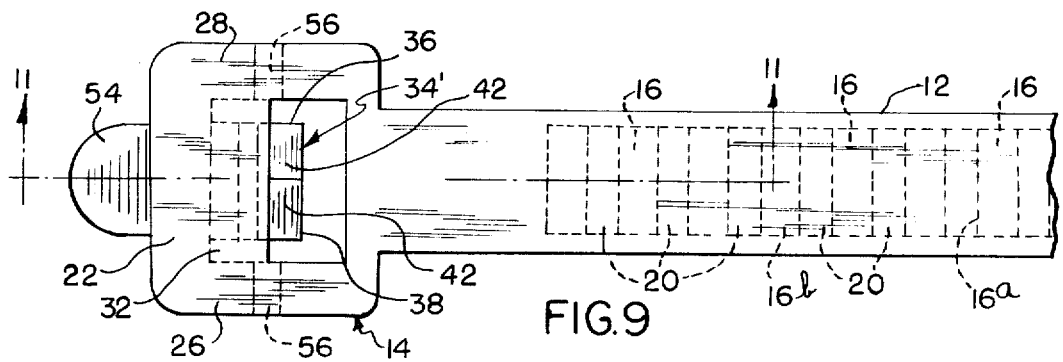
FIG. 9 is a top plan, fragmentary view of a further modified tie generally similar to FIG. 8, but showing in addition thereto means on the head portion for facilitating release of the locking action of the tie.
Figure 10:
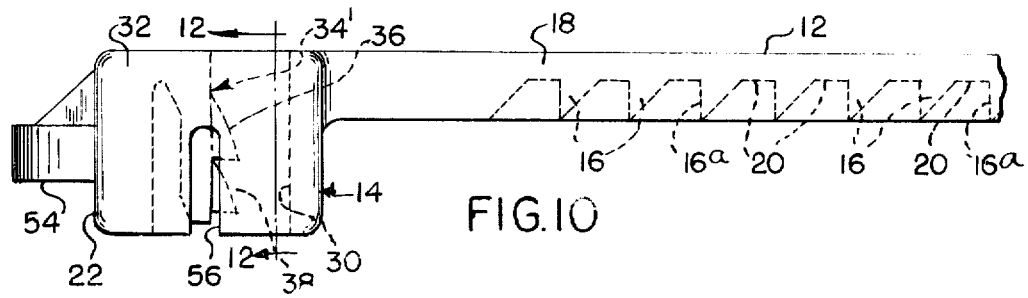
FIG. 10 is a side-elevational view of the tie of FIG. 9.

As can be best seen in FIGS. 2 and 6, the teeth 36,38 on the pawl are staggered transversely of the pawl, which staggering or offsetting of the teeth enables much more convenient manufacture of the tie than could be provided if the teeth were in aligned relation with one another. The pawl teeth 36,38 as can be seen in FIGS. 2 and 6, are each of a lateral dimension less than the width or transverse dimension of the pawl 34, providing for such staggered relationship. Also, the lateral dimension of each of the pawl teeth is preferably no more than half the width of the strap teeth, with the inner sides of the pawl teeth 36,38 terminating substantially at the longitudinal vertical center plane of the tie (FIGS. 2 and 9). The lengthwise axis of passageway 30 through the tie head likewise is preferably disposed in said longitudinal vertical center plane. As aforementioned, ties of this type are many times of relatively small size. As an example, the head 14 of a tie may be in the nature of 0.190 inches by 0.230 inches by 0.145 inches deep, with the width of the strap portion being in the nature of 0.109 inches, and the aperture or passageway through the head at the entry end thereof being in the nature of 0.055 inches by 0.115 inches. It will be understood therefore that since relatively small dimensions are many times involved in a bundling tie that the production or manufacture of the tie which can be most conveniently accomplished by using molding procedures, is rather complex especially as concerns the mold portions utilized to form the head and multi-toothed pawl of the bundling tie. Accordingly, by spacing or staggering the plural teeth transversely of the pawl so that formation of each tooth is possible without interference from the other pawl teeth, a tie is provided that not only will effectively hold the strap in looped and locked condition, but also one wherein the production of the tie is materially facilitated.

Each of the teeth 36,38 has a working or locking face 40 which is generally parallel to the plane of the surfaces or flats 20 on the strap portion 12, and generally perpendicular to the lengthwise axis through the passageway 30 in the head, and an arcuate or convex surface 42 which curves from the outer end of the respective working surface 40 back into the body of the pawl 34. This arcuate configuration of the frontal surface 42 of each of the teeth facilitates the movement of the teeth 16 on the strap portion past the teeth 36,38 on the pawl, during insertion of the strap portion through the passageway 30 in the head and into predetermined looped condition about a bundle of elements. Moreover, this arcuate or convex configuration of each of the pawl teeth also increases the strength of the respective pawl tooth, thereby providing for a stronger bundling tie.

Figure 4:
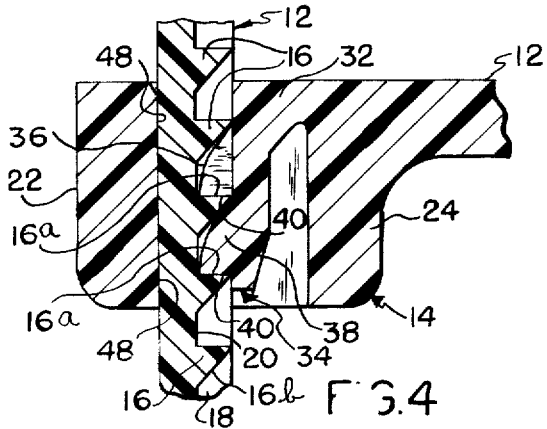
FIG. 4 is a sectional view showing the strap portion of the tie having been inserted through the head portion thereof, into locked condition but not having been pulled up tight around the elements being bundled.

Referring now to FIG. 4, there is illustrated the condition of the strap portion 12 when it has been looped (FIG. 7) and inserted through the passageway 30 in the head to a predetermined location. During movement of the strap portion through the passageway 30, the pawl 34 is caused to flex toward end wall 24 to permit passage of the teeth 16 on the strap portion past the teeth on pawl. As can be seen, the locking faces 16$_a$ on selected of the strap teeth 16, engage the locking faces 40 on the pawl teeth 36,38 in generally surface-to-surface contact.

Figure 5:
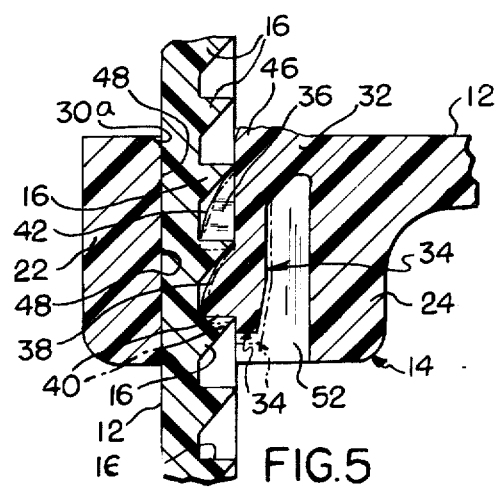
FIG. 5 is a view similar to FIG. 4 but showing the tie having been pulled into finalized locked condition in encompassed generally tensioned relation about a bundle of elements.

When the strap portion is continued to be pulled or pushed through the passageway 30 to tension the strap about a bundle or item to be secured, the pawl 34 may forced axially or upwardly (as viewed in FIG. 5), thus slightly deforming the bridging portion 32, but still maintaining generally surface-to-surface contact between the locking faces 16$_a$ on the strap teeth and the locking faces 40 on the pawl teeth. As can be seen, the inner surface 48 of end wall 22 is adapted to engage the side of the strap portion opposite the toothed side thereof, and maintain the strap and pawl teeth in interlocked condition. As can be seen from FIGS. 4 and 5, the flat sections 20 between the strap teeth provide sufficient space between the strap teeth for receiving the curved pawl teeth between the strap teeth.

Figure 7:
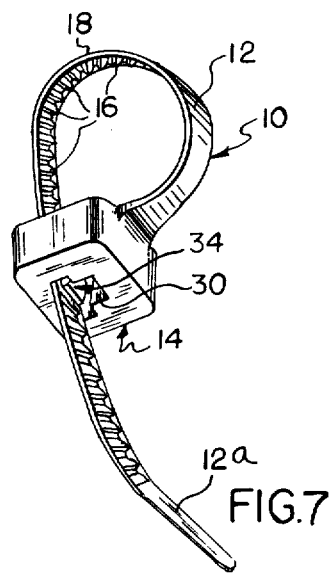
FIG. 7 is a generally bottom perspective view showing the strap portion of the tie looped for retaining a bundle, and passed through the head portion.

As can be best seen in FIGS. 6 and 7, the width of the strap is preferably just slightly less than the length of the cross arm section 31$_a$ of the passageway 30, while the base section 31 of the T-shaped passageway configuration is of a lesser width, and with the pawl 34 being of such width so as to be movably received between the side surfaces 52 defining the base section of the T-shaped passageway. Such relatively close side surfaces 52 will aid in stabilizing the pawl in the event of any tendency of the latter to "buckle" during extreme tightening of the strap of the tie.

Figure 8:
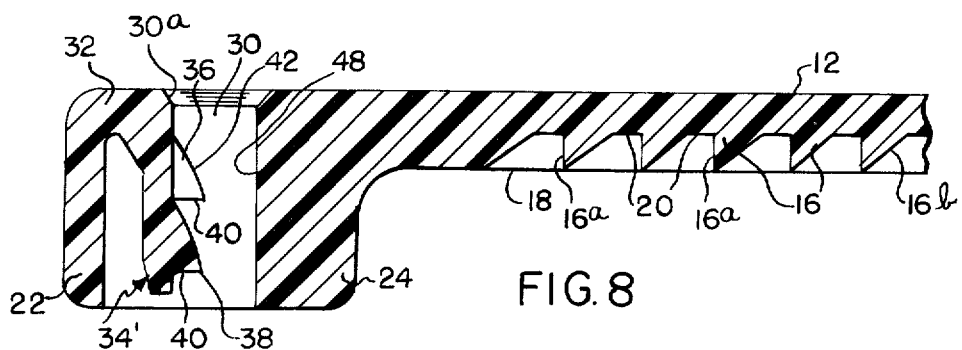
FIG. 8 is a sectional view generally similar to FIG. 3 but showing a modified form of bundling tie.

Referring now to FIG. 8, there is shown a modified arrangement wherein the pawl 34' is disposed on the opposite side of the head adjacent the outer side wall 22, of the head portion, rather than on the inner side wall 24 thereof, and with the teeth on the strap portion being disposed on the opposite side thereof as compared to the side in which the teeth are found in the FIGS. 1, 2 and 3 embodiments. In other respects, the FIG. 8 embodiment is generally similar to that of the FIGS. 1 through 7 embodiment, and operates in a similar manner, with the interior surface 48 on wall 24 being the surface adapted for engagement with the non-toothed side of the strap portion, to hold the teeth on the strap portion in interlocked condition with the teeth on the pawl when the tie is in encircling, tensioned relation about a member or bundle of members.

FIGS. 9, 10, 11, 12 and 13 disclose another embodiment which is generally similar to the FIG. 8 arrangement, except that in this embodiment there is provided means for aiding in unlocking the strap portion from the head portion in the event that deactuation and reuse of the tie is necessary or desirable.

In the embodiment illustrated, such means comprises a tab 54 provided on the exterior of outer wall 22 of the head, which is adapted to be engaged with the finger of a workman to flex the wall and attached or mounted pawl portion 34' outwardly away from engagement with the strap teeth, so that the strap can be pulled out of the passageway 30 and release the locking coaction of the strap teeth with the pawl teeth. To facilitate the flexure of the pawl and associated end wall 22 outwardly and away from the strap teeth, slots 56 may be provided in the side walls 26,28 of the head portion, for increasing the flexibility thereof upon application of pressure by means of the tab 50. In other respects, this bundling tie of the FIGS. 9 through 13 embodiment may be generally similar to the embodiment illustrated for instance in FIG. 8.

FIG. 14 shows a further embodiment which is provided with means for securing the tie to a support. In this embodiment such means 58 comprises an eye portion 58$_a$, and which is formed integrally with the head and which is adapted to receive fastener means therethrough, for securing the tie to a supporting surface such as for instance a circuit board or harness board. The eye or opening 58$_a$ extends completely through portion 58 and may receive for instance a bolt or threaded member therethrough.

FIG. 15 shows another type of means 58' for attaching the tie to a support. In this instance the attaching means comprises a tapered, compressible dart 60 which may be molded integrally with the head 14 of the tie, and which is adapted to be forced through a hole or the like, in a support such as a panel, for securing the tie and the encircled member being bundled to the panel.

FIG. 16 illustrates a further embodiment of tie wherein there is connected to the tie a member 62, which in this instance is molded integrally with the strap portion, for placing indentifying or informative indicia thereon. For instance, the plate 62 could contain either printed or molded information relating to the elements or item which is adapted to be encircled or bundled by the tie, or could also be used in color coded form to identify the significance of the bundled elements or the like.

From the foregoing description and accompanying drawings it will be seen that the invention provides a novel flexible bundling tie of the type embodying a flexible pawl having a plurality of teeth thereon, for locking coaction with teeth on the strap of the tie, and wherein the teeth on the pawl are staggered with respect to one another in a direction transverse of the pawl, whereby the bundling tie provides good locking action and resistance to unintentional locking of the tie and also provides a tie arrangement which can be more expeditiously manufactured, utilizing mass production techniques. The invention also provides a tie embodying a toothed pawl wherein the pawl tooth embodies means for facilitating insertion of the strap portion of the tie through the head portion thereof, and past the pawl, and also a pawl of increased strength and resistance to being pulled out of locking coaction with the strap.

The terms and expressions which have been used are used as terms of description and not of limitation, and there is no intention in the use of such terms and expressions of excluding any equivalents of any of the features shown or described, or portions thereof, and it is realized that various modifications are possible within the scope of the invention claimed.

What is claimed is:

1. A flexible bundling tie including an elongated strap and a head attached to one end thereof adapted for locking coaction with the strap, said strap having teeth formed on one side thereof, said head having a generally vertically extending aperture therethrough adapted to receive the strap, a generally flexible vertically elongated pawl formed on said head and extending into said aperture in the same general direction of extension as the axis of said aperture, said pawl having a plurality of spaced teeth projecting therefrom in said aperture adapted for abutting engagement with respective of the strap teeth to hold the tie in encompassing relation to a bundle, at least certain of said pawl teeth in a direction transverse of said pawl extending laterally a lesser distance than the width of said pawl and being staggered with respect to one another in a direction transverse of said pawl.

2. A tie in accordance with claim 1 wherein said tie is formed of resilient moldable material, such as for instance, plastic.

3. A tie in accordance with claim 1 wherein said aperture is defined in part by an interior face of said head adapted for engagement with the side of said strap opposite the toothed side thereof when the strap is in locked condition in said head.

4. A tie in accordance with claim 3 wherein the surfaces of said pawl teeth disposed in confronting relation to said face are of generally convex configuration.

5. A tie in accordance with claim 4 wherein said aperture is elongated and comprises an entry end and an exit end spaced along said aperture axis from said entry end, said aperture being of generally T-shaped configuration in plan at said exit end and includes a base section and a cross arm section, said bridge portion extending across said base section adjacent said entry end with said pawl extending into said aperture from said bridge portion and in a direction toward said exit end, said cross arm section being defined in part by an interior face of said head disposed in confronting relation to said pawl, said face being adapted for engagement with the side of said strap opposite the toothed side thereof when the strap is received in said head, each of said pawl teeth in the inward lateral direction terminating generally at the longitudinal vertical center plane of said tie, the lengthwise axis of said aperture being disposed generally in said center plane.

6. A tie in accordance with claim 1 wherein said pawl resiliently depends from a bridge portion on said head, so that said pawl can flex as the strap is drawn through the aperture past the pawl.

7. A tie in accordance with claim 1 including means on said pawl teeth for facilitating insertion of the toothed strap through the aperture past said pawl teeth.

8. A tie in accordance with claim 1 wherein said pawl is connected to said head by means of a bridge portion extending across said head adjacent the connection of said head to said strap, said pawl being adapted to flex with respect to said head at said bridge portion upon insertion of the strap through said aperture to permit passage of the strap teeth past the pawl teeth during looping of the tie about a bundle.

9. A tie in accordance with claim 1 wherein the entrance to said aperture for receiving said strap is divergent for facilitating entry of the strap end into the aperture.

10. A tie in accordance with claim 1 wherein said aperture has an entrance end and an exit end, the free end of the strap being bent out of the plane of the remainder of the strap in a direction away from said exit end of said head aperture.

11. A tie in accordance with claim 10 wherein said securing means comprises a dart on said head adapted to be received in secured relation in a hole in the support.

12. A tie in accordance with claim 10 wherein said securing means comprises an apertured tab on said head portion, adapted for receiving a fastener therethrough to secure said tie to a support.

13. A tie in accordance with claim 12 wherein the last mentioned means comprises a plate-like portion.

14. A tie in accordance with claim 13 wherein said teeth on said strap are of generally buttress type and the surfaces of said pawl teeth which are disposed in confronting relation to said face are of generally convex configuration for increasing the strength of the pawl teeth and for facilitating insertion of the toothed strap through the aperture past the pawl teeth.

15. A tie in accordance with claim 10 including means thereon for receiving identifying indicia.

16. A tie in accordance with claim 1 including means for securing the tie to a support.

17. A flexible bundling tie including an elongated strap and a head attached to one end thereof adapted for locking coaction with the strap, said strap having teeth formed on one side thereof, said head having an aperture therethrough adapted to receive the strap, a generally flexible pawl formed on said head extending into said aperture, said pawl having a plurality of spaced teeth of generally convex configuration which extend for a lateral dimension of no more than half the width of the strap teeth, adapted for abutting engagement with respective of the strap teeth to hold the tie in encompassing relation to a bundle, at least certain of said pawl teeth being staggered with respect to one another in a direction transverse of said pawl.

* * * * *